Figure 1:
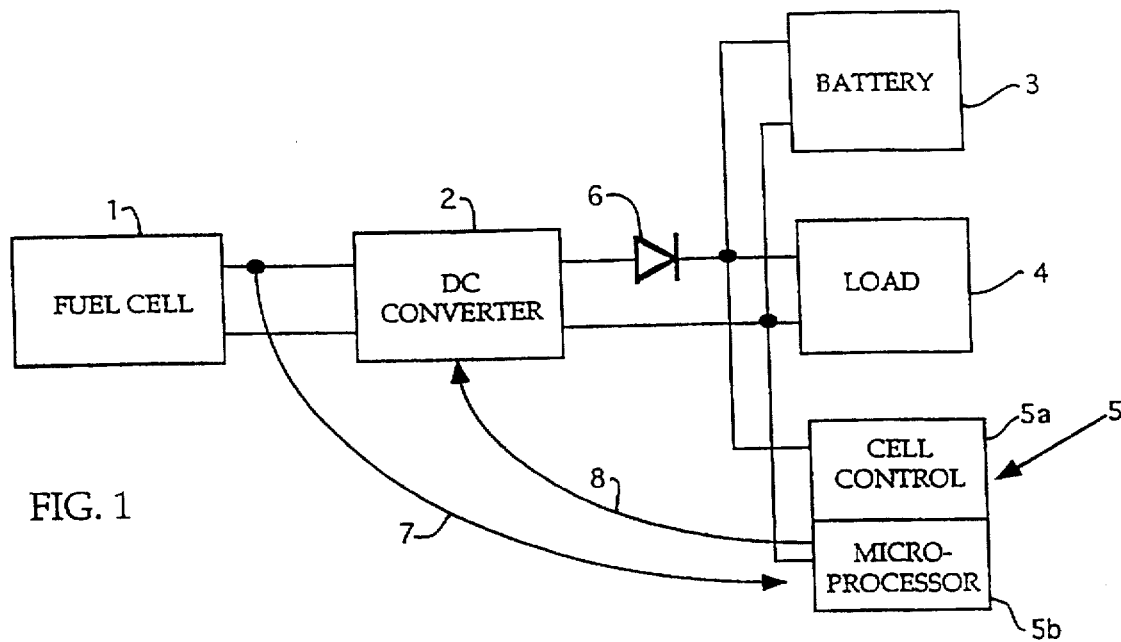

United States Patent [19]
Bonnefoy

[11] Patent Number: 5,714,874
[45] Date of Patent: Feb. 3, 1998

[54] FUEL CELL VOLTAGE GENERATOR

[75] Inventor: Pierre Bonnefoy, Cagnes Sur Mer, France

[73] Assignee: Imra Europe SA, Valbonne, France

[21] Appl. No.: 783,699

[22] Filed: Jan. 15, 1997

Related U.S. Application Data

[63] Continuation of Ser. No. 300,870, Sep. 6, 1994, abandoned.

[30] Foreign Application Priority Data

Sep. 6, 1993 [FR] France ............... 93 10564

[51] Int. Cl.$^6$ ............................................. H01M 8/04
[52] U.S. Cl. ............................................. 323/299
[58] Field of Search .............. 320/6, 2–5, 15–19, 320/31–33, 48–49; 323/299–304

[56] References Cited

U.S. PATENT DOCUMENTS

| | | |
|---|---|---|
| 4,000,003 | 12/1976 | Baker et al. ............ 429/7 |
| 4,677,037 | 6/1987 | Takabayashi ........... 429/22 |
| 4,778,579 | 10/1988 | Levy et al. ............... 429/23 |
| 4,883,724 | 11/1989 | Yamamoto ................ 429/23 |
| 5,023,150 | 6/1991 | Takabayashi ........... 429/22 |

FOREIGN PATENT DOCUMENTS

| | | |
|---|---|---|
| 0334474 | 9/1989 | European Pat. Off. |
| 1473798 | 5/1977 | United Kingdom |

*Primary Examiner*—Aditya Krishnan
*Attorney, Agent, or Firm*—Foley & Lardner

[57] ABSTRACT

The invention relates to a voltage generator including a fuel cell, a d.c. converter and a storage battery, the input terminals of the d.c. converter being connected to the fuel cell terminals and the output terminals of the d.c. converter being connected on the voltage generator terminals in parallel with those of the battery. A microprocessor regulates the maximum intensity value of the current going through the d.c. converter responsive to the voltage measured at the terminals of the fuel cell in order to maintain the voltage near a preset reference value.

6 Claims, 2 Drawing Sheets

FUEL CELL VOLTAGE GENERATOR

This application is a continuation of application Ser. No. 08/300,870, filed Sep. 6, 1994 now abandoned.

The present invention concerns a voltage generator including a fuel cell and a storage battery assembled in parallel.

Such voltage generators, known as hybrid systems, have the advantage of constituting non polluting, silent and high efficiency energy sources, it the fuel cell produces the entire current available at the generator terminals.

In such hybrid systems, the fuel cell, which cannot cope with sudden peaks of electric energy consumption, due to the inertia of the electrochemical process taking place inside and to the limited power of the fuel cell, is associated with a battery acting as a buffer by supplying the additional necessary energy when needed and by storing the excess of energy in the opposite case.

It is known that, generally, a fuel cell has to work with a certain terminal voltage. Otherwise, its electrodes may deteriorate rapidly, and would wear out the fuel cell.

We already know hybrid systems in which a d.c. converter is placed between the fuel cell and the storage battery in order to adjust the voltage produced at the fuel cell to a value close to the working voltage of the battery.

But these devices are not capable of preventing a lowering of the terminal voltage of the fuel cell and of forcing at any moment the working of the fuel cell to a maximum capacity, while excess energy is stored in the battery.

We also know devices, in a voltage generator of the hybrid system type, which cut off the fuel cell when current load demand is too high, that is, when the terminal voltage of the fuel cell is lower than a minimum good working value.

But such devices, operating in the all or nothing mode, don't make the most of the fuel cell, since the latter doesn't supply continuously is maximum output of electric power.

The present invention aims at supplying a voltage generator of the hybrid system type in which the fuel cell is kept continuously in optimal working conditions, that is to say in which, regardless of the load demand, the fuel cell supplies continuously a maximum electric power, the excess being stored in a battery and used as energy buffer.

The present invention has as an object a voltage generator comprising a fuel cell, a d.c. converter and a storage battery, the input terminals of d.c. converter being connected to the fuel cell terminals and the output terminals of the said d.c. converter being connected, in parallel with those of the battery, on the terminals of the voltage generator, characterized by the fact that it also includes control means of the d.c. converter, acting on the maximum intensity value of the current going through the said d.c. converter, according to the voltage measured at the terminals of the fuel cell, in order to keep this voltage in the region of a preset reference value.

The voltage generator according to the invention is original in that the d.c. converter with which it is equipped, isn't used for stabilizing the voltage present at its output terminals, as is done in a conventional usage of a converter, but is used for stabilizing the voltage present at its input terminals.

In practice, the reference value of the voltage at the fuel cell terminals is determined, by experiment, as being the point of the voltage/current characteristic of the fuel cell corresponding to a maximum power output in normal working conditions of said fuel cell.

Considering the great number of parameters conditioning the working of a fuel cell, in practice, very difficult to determine instantly the power available at the terminals of said fuel cell.

In these conditions, the value of the maximum intensity of the current going through the converter cannot be known beforehand, which is why the control means of the converter according to the invention work in action/reaction loop by measuring the voltage at the fuel cell terminals and by adjusting the value of maximum intensity so that the voltage measured at the fuel cell terminals corresponds to the preset reference voltage.

Advantageously, the voltage generator according to the invention is also provided with means for the disconnection of the fuel cell, which start acting in case the voltage at the fuel cell terminals stays below the reference value, in spite of the action of the control means of the converter.

Figure 2:
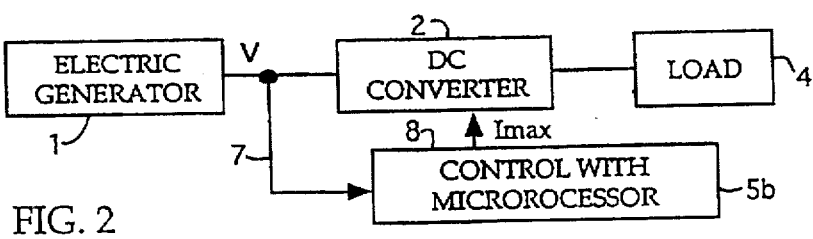
Figure 3:
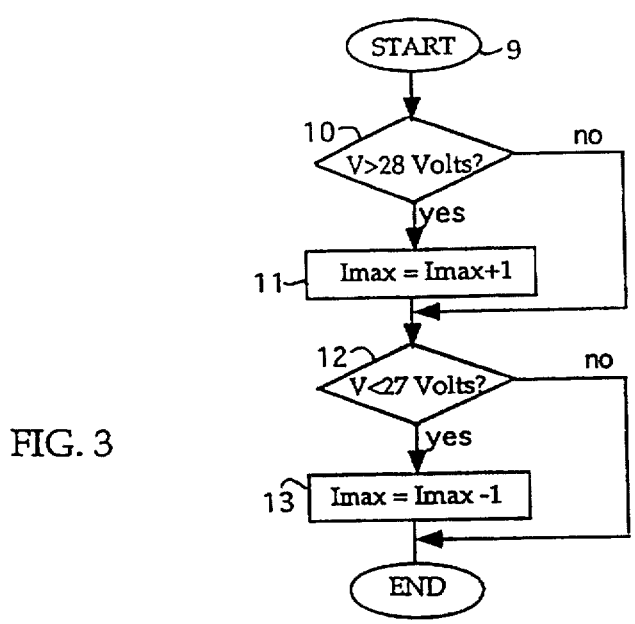
Figure 4:
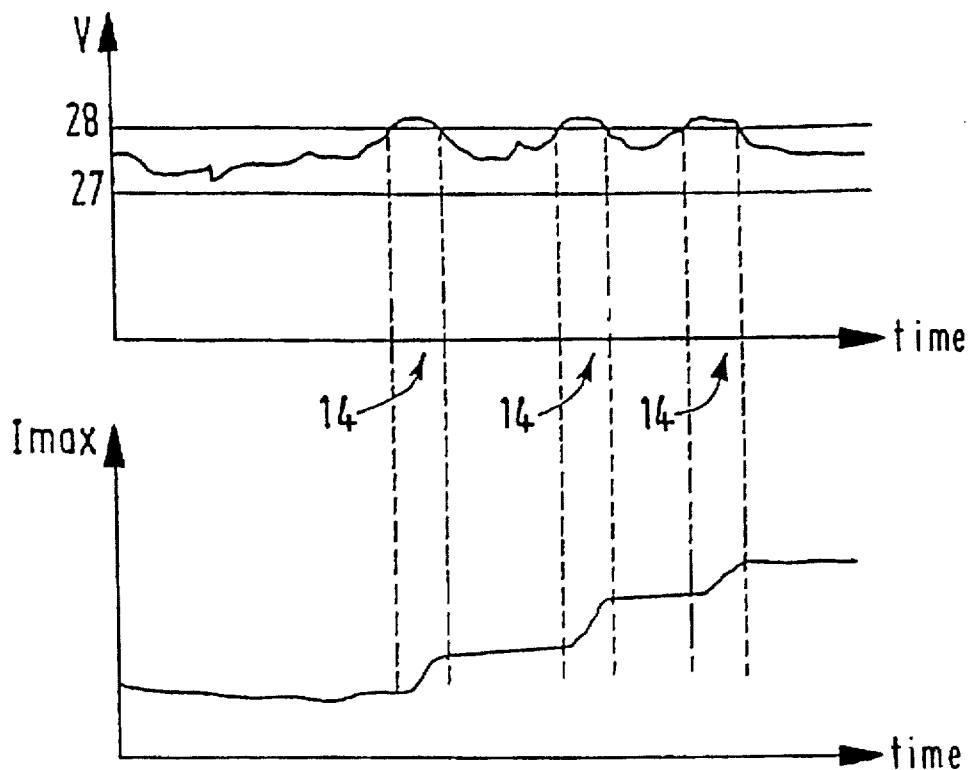
Figure 5:
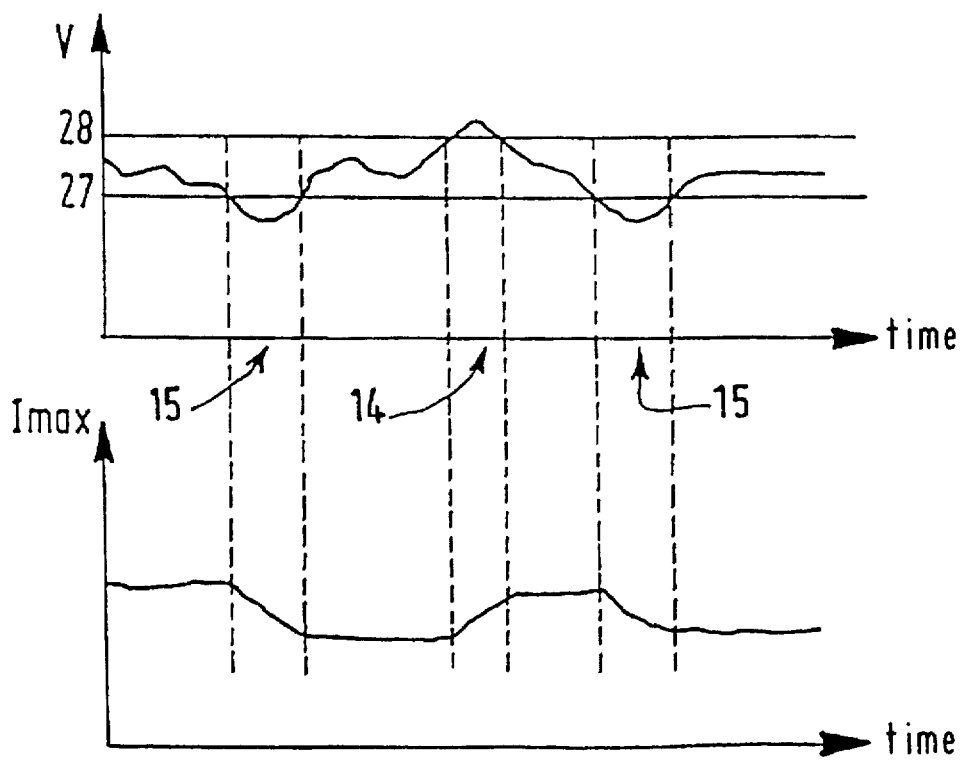

In order to get a better understanding of the invention, we are going to describe now a realization mode given as a non restrictive example, in reference to the attached drawing in which:

FIG. 1 is a schematic view of the different components of a voltage generator according to the invention, FIG. 2 is a synoptic diagram showing the action/reaction loop control made, according to the invention, at the fuel cell terminals, FIG. 3 is a simplified flow diagram of the microprocessor control on the d.c. converter, FIG. 4 shows the variations of electrical parameters of the generator according to the invention during a transitory phase of temperature rise, and FIG. 5 shows the variations of electrical parameters of the generator according to the invention, during a phase of variation of the current load.

In FIG. 1, the output terminals of a fuel cell 1 are electrically connected to the input terminals of a d.c. converter 2.

The output terminals of the converter 2 are mounted together with those of a rechargeable battery 3, to the terminals of a current load 4 which can be, for instance, an electric motor.

A control block 5 is also connected in parallel on the terminals of load 4.

The control block 5 is divided in two parts, a first part 5a, grouping all the means necessary for the working control of the fuel cell, that is to say its hydrogen supply, its temperature control and etc. and the part 5b comprising the control means of the converter according to the invention, namely a microprocessor.

The working principle of the generator according to the invention is now going to be described.

At the start of the operation, the battery 3 supplies at the same time the load 4 and the control means of the cell 5a, the latter being started by the control means.

At this moment, the fuel cell 1 isn't yet in action; it first has to heat up before supplying an electric energy that can be used by the load 4.

As the fuel cell begins to generate enough electric power, it replaces progressively the battery 3 so as to become the only energy source of the generator. It then also supplies the control block 5.

If the load 4 requires an electric power lower than the one available at the fuel cell 1 terminals, the battery takes profit from the excess of electric energy and recharges.

In the opposite case, the battery 3 supplies to the load 4 the electric power lacking at the fuel cell terminals.

A semiconductor diode 6, placed between the d.c. converter 2 and the battery 3, prevents reverse current in the fuel cell 1.

According to the invention, the voltage at the fuel cell 1 terminals is stabilized around a preset reference value, by experiment, at a value corresponding to an optimal working range of the fuel cell.

FIG. 2 is a synoptic diagram showing the control in action/reaction loop made by the microprocessor on the fuel cell.

This control applies more generally to all electric generators in which output voltage has to be stabilized.

The microprocessor 5b measures the voltage V at the electric generator terminals, as indicated by the arrows 7 in FIGS. 1 and 2.

Then the microprocessor 5b executes the simplified flow diagram illustrated on FIG. 3.

Beginning from the starting step 9, the microprocessor 5b compares in Step 10 the voltages value V with an upper limiting value fixed by experiment at 28 Volts.

If the voltage V at the electric generator terminals is above this upper limiting value, the microprocessor triggers in Step 11 the incrementation of the maximum value Imax of the current going through the d.c. converter.

This rise of the Imax increases the electric power demand at the generator terminals and leads to a decrease of the voltage V.

In the opposite case, that is, if the voltage V is not higher than the upper limiting value, the microprocessor 5b compares in Step 12, the voltage value V with a lower limiting value which is here of 27 volts.

Thus, if the voltage V is lower than 27 volts, the microprocessor 5b provokes in Step 13 a decrease of the Imax value of the maximum current going through the converter.

Contrary to the previous case, this Imax variation leads to an increase of the voltage V at the terminals of the electric generator.

The microprocessor 5b realizes this control periodically, for instance every 10 ms.

FIGS. 4 and 5 illustrate the variations of the voltage V at the fuel cell terminals and of the Imax maximum value of the current going through the converter during the working of the generator according to the invention.

FIG. 4 corresponds to the phase of temperature rising of the fuel cell, when the generator starts working.

The time scales of the voltage and current curves are identical.

One can clearly see in FIG. 4 that the voltage V is kept within the lower and upper limiting values which are respectively 27 and 28 volts.

These voltage controls are realized by changing the Imax value.

Indeed, during the three spaces of time shown by the reference number 14, the voltage V exceeds the upper limit of 28 volts. In reaction, the Imax value is incremented until the voltage V gets back to a value below 28 volts.

FIG. 5 corresponds to the standard working of the generator according to the invention, during variations of the current load demand 4. During a phase 14 in which the voltage V takes up values higher than 28 volts owing to a decrease of the load 4, the Imax value is incremented until the voltage V goes down below 28 volts.

Inversely, the load 4 increases in phases 15 during which the voltage V is below the lower limiting value of 27 volts.

In this case, the Imax value is decremented until the voltage V reaches a value higher than 27 volts.

It is understandable that the generator according to the invention makes the best use of the fuel cell which then works permanently under optimal conditions.

However some boundary situations have to be taken over by the control block 5, as these situations correspond to a malfunction of the generator or to deterioration risks of the fuel cell.

Generally, the control block 5 acts for:

disconnecting the fuel cell in case the voltage V at the terminals of the latter stays below the minimum value required for the proper working of the said cell, in spite of the power regulation realized by the d.c. converter.

interrupting the working of the fuel cell in case the voltage at the batteries terminals is too high or too weak.

It is obvious that the realization mode that has just been described is not restrictive and may undergo any desired modification without going out of the invention scope.

Possibly, one or more voltage or additional current regulators may be used in series with the load or the battery, in order to be able to control the electric power received by these apparatus according to the type of application.

I claim:

1. A voltage generator having terminals to be connected to a current load, comprising:
    a fuel cell for generating electrical energy to be used by the current load;
    a d.c. converter having input terminals connected to terminals of the fuel cell and output terminals connected to the voltage generator terminals;
    a storage battery having terminals connected to the voltage generator terminals in a parallel connection with the d.c. converter output terminals; and
    control means for modifying a maximum intensity value of the current flowing through said d.c. converter in accordance with a voltage measured at the terminals of the fuel cell to keep said voltage within a predetermined range, at which a power output of the fuel cell is maximum.

2. A voltage generator having terminals to be connected to a current load, comprising:
    a fuel cell for generating electrical energy to be used by the current load;
    a d.c. converter having input terminals connected to terminals of the fuel cell and output terminals connected to the voltage generator terminals;
    a storage battery having terminals connected to the voltage generator terminals in a parallel connection with the d.c. converter output terminals, the storage battery storing electrical energy which is in excess of that required by the current load and supplying additional electrical energy to the current load if the current load requires more electrical energy than that generated by the fuel cell; and
    control means for modifying a maximum intensity value of the current flowing through said d.c. converter in accordance with a voltage measured at the terminals of the fuel cell to keep said voltage within a predetermined range.

3. A voltage generator according to claim 2, wherein the control means includes means for measuring the voltage at the terminals of the fuel cell, and wherein the control means respectively increments and decrements the maximum intensity value of the current following through the d.c. converter when the voltage measured at the terminals of the fuel cell is above and below said predetermined range.

4. A voltage generator according to claim 3, wherein said predetermined range corresponds to a voltage range at which a power output of the fuel cell is maximum.

5. A voltage generator having terminals to be connected to a current load, comprising:
    a fuel cell for generating electrical energy to be used by the current load;
    a d.c. converter having input terminals connected to terminals of the fuel cell and output terminals connected to the voltage generator terminals;

a storage battery having terminals connected to the voltage generator terminals in a parallel connection with the d.c. converter output terminals; and control means for modifying a maximum intensity value of the current flowing through said d.c. converter in accordance with a voltage measured at the terminals of the fuel cell to continuously keep said voltage within a predetermined range, at which a power output of the fuel cell is maximum, said control means including means for measuring the voltage at the terminals of the fuel cell, and respectively incrementing and decrementing the maximum intensity value of the current flowing through the d.c. converter when the voltage measured at the terminals of the fuel cell is above and below said predetermined range.

6. A voltage generator having terminals to be connected to a current load, comprising:

a fuel cell for generating electrical energy to be used by the current load;

a d.c. converter having input terminals connected to terminals of the fuel cell and output terminals connected to the voltage generator terminals;

a storage battery having terminals connected to the voltage generator terminals in a parallel connection with the d.c. converter output terminals; and control means for modifying a maximum intensity value of the current flowing through said d.c. converter in accordance with a voltage measured at the terminals of the fuel cell to continuously keep said voltage within a predetermined range, at which a power output of the fuel cell is maxium.

wherein said storage battery stores electrical energy which is in excess of that required by the current load and supplies additional electrical energy to the current load if the current load requires more electrical energy than that generated by the fuel cell.

* * * * *